(12) United States Patent
Hong et al.

(10) Patent No.: US 12,526,675 B2
(45) Date of Patent: Jan. 13, 2026

(54) RANDOM ACCESS METHOD AND APPARATUS, AND STORAGE MEDIUM

(71) Applicant: BEIJING XIAOMI MOBILE SOFTWARE CO., LTD., Beijing (CN)

(72) Inventors: Wei Hong, Beijing (CN); Ming Zhang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 545 days.

(21) Appl. No.: 18/014,144

(22) PCT Filed: Jul. 17, 2020

(86) PCT No.: PCT/CN2020/102802
§ 371 (c)(1),
(2) Date: Dec. 30, 2022

(87) PCT Pub. No.: WO2022/011709
PCT Pub. Date: Jan. 20, 2022

(65) Prior Publication Data
US 2023/0262778 A1    Aug. 17, 2023

(51) Int. Cl.
*H04W 74/0833* (2024.01)
*H04W 24/10* (2009.01)
*H04W 74/0836* (2024.01)

(52) U.S. Cl.
CPC ....... *H04W 24/10* (2013.01); *H04W 74/0833* (2013.01); *H04W 74/0836* (2024.01)

(58) Field of Classification Search
None
See application file for complete search history.

(56) References Cited

U.S. PATENT DOCUMENTS

| 12,279,315 | B2* | 4/2025 | Pantelidou | H04W 74/004 |
| 12,356,468 | B2* | 7/2025 | Lin | H04W 74/0833 |
| 2018/0138962 | A1* | 5/2018 | Islam | H04L 5/0032 |
| 2020/0083947 | A1* | 3/2020 | Islam | H04L 5/0032 |
| 2021/0185736 | A1* | 6/2021 | Shi | H04W 74/004 |
| 2021/0227586 | A1* | 7/2021 | Huang | H04W 52/242 |
| 2021/0368546 | A1* | 11/2021 | K Abraham | H04W 74/0836 |
| 2022/0007422 | A1* | 1/2022 | Zhang | H04W 74/0833 |
| 2022/0225433 | A1* | 7/2022 | Lin | H04W 72/044 |

(Continued)

FOREIGN PATENT DOCUMENTS

| CN | 110859011 A | 3/2020 |
| WO | 2010124453 A1 | 11/2010 |

(Continued)

OTHER PUBLICATIONS

CNOA issued on Application No. 202080001554.7 dated Dec. 27, 2023 with English translation, (15p).

(Continued)

*Primary Examiner* — Faiyazkhan Ghafoerkhan
(74) *Attorney, Agent, or Firm* — Arch & Lake LLP; Hao Tan; Shen Wang

(57) ABSTRACT

A random access method performed by a terminal includes: recording association information related to a random access process of attempting to access a base station during the random access process; and reporting the association information to the base station after establishing a radio resource control (RRC) connection with the base station.

20 Claims, 11 Drawing Sheets

Receiving association information reported by a first terminal that has established a radio resource control RRC connection with the base station — 201

Determining, according to the association information, parameters of the second terminal during the random access process of attempting to access the base station — 202

(56) References Cited

U.S. PATENT DOCUMENTS

| | | | | |
|---|---|---|---|---|
| 2022/0361250 A1* | 11/2022 | Lin | ................... | H04W 74/006 |
| 2023/0084632 A1* | 3/2023 | Xie | ................... | H04W 74/002 |
| | | | | 370/329 |
| 2023/0262778 A1* | 8/2023 | Hong | ............... | H04W 74/0833 |
| | | | | 370/329 |
| 2024/0080906 A1* | 3/2024 | Zhang | .................. | H04W 24/10 |

FOREIGN PATENT DOCUMENTS

| | | | | |
|---|---|---|---|---|
| WO | 2013064103 A1 | | 5/2013 | |
| WO | 2018053255 A1 | | 3/2018 | |
| WO | WO-2020042962 A1 | * | 3/2020 | ........ H04W 74/0833 |

OTHER PUBLICATIONS

Search Report for EP Application No. 20944986.7 dated Feb. 26, 2024, (46p).

International Search Report issued in Application No. PCT/CN2020/102802, dated Apr. 21, 2021, with English translation, (4p).

Nokia, et al., "Remaining details of 2-step RACH Procedure", 3GPP TSG RAN WG1 #98bis, R1-1910689, Chongqing, China, Oct. 14-18, 2019,(31p).

CNOA of Application No. 202080001554.7 dated on Apr. 28, 2023 with English translation,(10p).

\* cited by examiner

RANDOM ACCESS METHOD AND APPARATUS, AND STORAGE MEDIUM

CROSS-REFERENCE TO RELATED APPLICATION

This application is a national phase of International Application No. PCT/CN2020/102802, filed on Jul. 17, 2020, the content of which is hereby incorporated by reference in its entirety for all purposes.

TECHNICAL FIELD

The present disclosure relates to the field of communication, and in particular, to a random access method and apparatus, and a storage medium.

BACKGROUND

In order to extend 5G (5th generation mobile communication technology) NR (New Radio) technology to unlicensed frequency bands, 3GPP (3rd Generation Partnership Project) passed a 5G research project "Study on NR-based Access to Unlicensed Spectrum", which is intended to enable the NR to meet the regulatory requirements of the unlicensed frequency bands through the research of this project, and to be able to ensure peaceful coexistence with other access technologies working in the unlicensed frequency bands. The Listen Before Talk (LBT) mechanism is required by regulations of many countries, so if the NR wants to work normally in the unlicensed frequency bands, it also needs to follow the LBT mechanism.

SUMMARY

According to a first aspect of the present disclosure, a random access method performed by a terminal is provided, which includes:
  recording, during a random access process of attempting to access a base station, association information related to the random access process;
  reporting the association information to the base station after establishing a radio resource control RRC connection with the base station.

According to a second aspect of the present disclosure, a random access method performed by a base station is provided, which includes:
  receiving association information reported by a first terminal that has established a radio resource control RRC connection with the base station; wherein the association information is information related to the random access process recorded by the first terminal during the random access process of attempting to access the base station;
  determining, according to the association information, parameters of the second terminal during the random access process of attempting to access the base station.

According to a third aspect of the embodiments of the present disclosure, a computer-readable storage medium is provided, the storage medium stores a computer program, which is configured to execute any one of the random access methods according to the first aspect.

According to a fourth aspect of the embodiments of the present disclosure, a computer-readable storage medium is provided, the storage medium stores a computer program, which is configured to execute any one of the random access methods according to the second aspect.

According to a fifth aspect of the embodiments of the present disclosure, a terminal is provided and the terminal includes:
  a processor;
  a memory for storing processor-executable instructions;
  wherein the processor is configured to:
    record, during a random access process of attempting to access a base station, association information related to the random access process;
    report the association information to the base station after establishing a radio resource control RRC connection with the base station.

According to a sixth aspect of the embodiments of the present disclosure, a base station is provided and the base station includes:
  a processor;
  a memory for storing processor-executable instructions;
  wherein the processor is configured to:
    receive association information reported by a first terminal that has established a radio resource control RRC connection with the base station; wherein the association information is information related to the random access process recorded by the first terminal during the random access process of attempting to access the base station;
    determine, according to the association information, parameters of the second terminal during the random access process of attempting to access the base station.

It is to be understood that both the foregoing general description and the following detailed description are exemplary and explanatory only and are not restrictive of the present disclosure.

BRIEF DESCRIPTION OF THE DRAWINGS

The accompanying drawings here, which are incorporated in the specification and constitute a part of the present specification, illustrate embodiments consistent with the present invention and together with the description serve to explain the principles of the present invention.

DETAILED DESCRIPTION

The embodiments will now be described in detail here, examples of which are illustrated in the accompanying drawings. When the following description relates to the accompanying drawings, the same numerals in different drawings refer to the same or similar elements unless otherwise indicated. The implementations described in the following embodiments do not represent all implementations consistent with the present invention. Rather, they are merely examples of apparatuses and methods consistent with aspects of the present invention as recited in the appended claims.

The terminologies used in the present disclosure are for the purpose of describing particular embodiments only, and are not intended to limit the present disclosure. As used in the present disclosure and the appended claims, the singular forms "a", "said", and "the" are intended to include the plural forms as well, unless the context clearly dictates otherwise. It should also be understood that the term "and/or" as used herein refers to and includes any and all possible combinations of one or more of the associated listed items.

It should be understood that although the terms first, second, third, etc. may be used in the present disclosure to describe various information, these items of information should not be limited to these terms. These terms are only used to distinguish information of the same type from one another. For example, without departing from the scope of the present disclosure, first information may also be referred to as second information, and similarly, second information may also be referred to as first information. Depending on the context, the word "if" as used herein may be interpreted as "upon" or "when" or "in response to determination."

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

Before introducing the random access solution provided by the embodiments of the present disclosure, the contention-based four-step random access type and the contention-based two-step random access type will be introduced first.

Figure 1A:
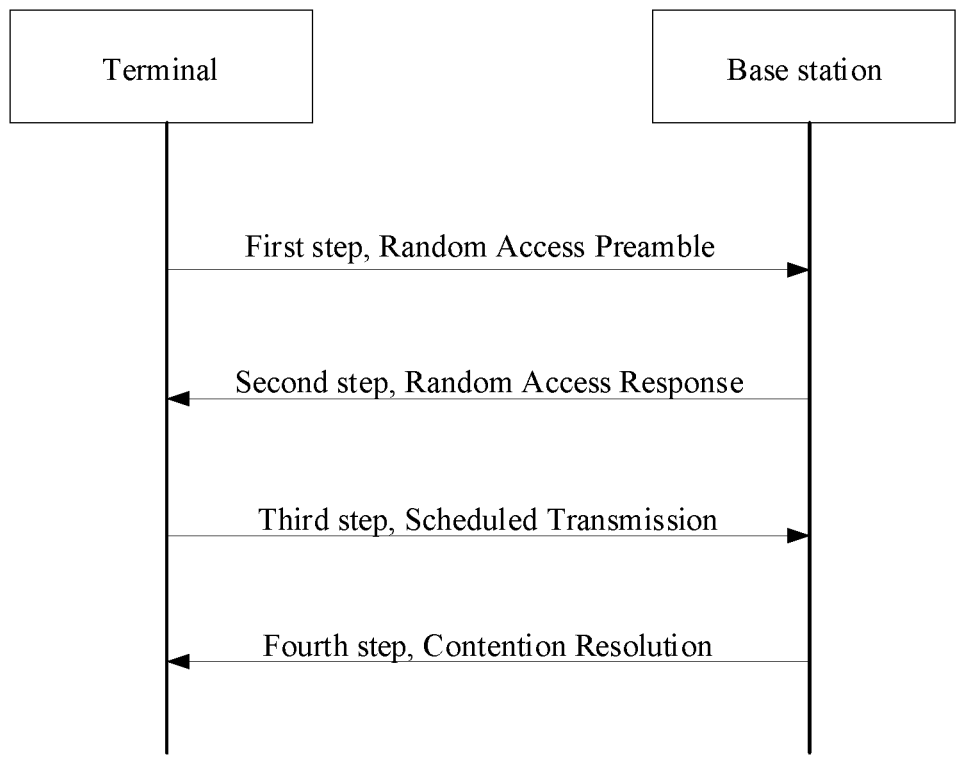
FIG. 1A is a schematic flowchart of a contention-based four-step random access type shown according to an embodiment.

The contention-based four-step random access type is as shown in FIG. 1A, including: a first step, in which a terminal sends a Random Access Preamble to a base station; a second step, in which the base station returns a Random Access Response; a third step, in which the terminal sends Scheduled Transmission; a fourth step, in which the base station returns Contention Resolution.

Figure 1B:
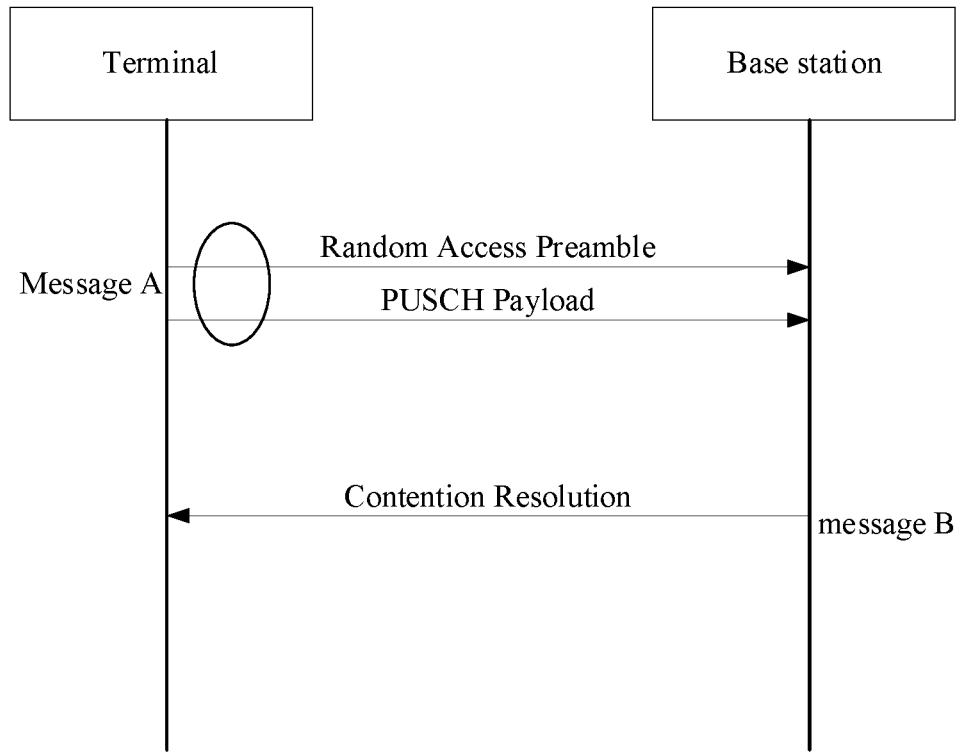
FIG. 1B is a schematic flowchart of a contention-based two-step random access type shown according to an embodiment.

The contention-based two-step random access type is as shown in FIG. 1B for example, including: a first step, in which a terminal sends a newly defined message A (MSG A) to a base station, wherein the message A is used to transmit a Random Access Preamble and PUSCH (Physical Uplink Shared Channel) payload; a second step, in which the base station returns a newly defined message B (MSG B), which is a reply to the message A and may include a reply of Contention Resolution, a fallback indication, and a backoff indication.

In the process of random access, the terminal may select the contention-based two-step random access type in the case where the measured RSRP (Reference Signal Receiving Power) is greater than a certain threshold value; otherwise, select the contention-based four-step random access type. It can be seen that if the selected threshold value is unreasonable, it will directly lead to a low success rate of the random access performed by the terminal. In addition, in the process of random access, if the selected initial transmission power value is unreasonable, it is also easy for the terminal to fail in random access for many times, which will also cause a low success rate of random access.

In order to solve the above problems, the present disclosure provides the following random access solutions.

Figure 2:
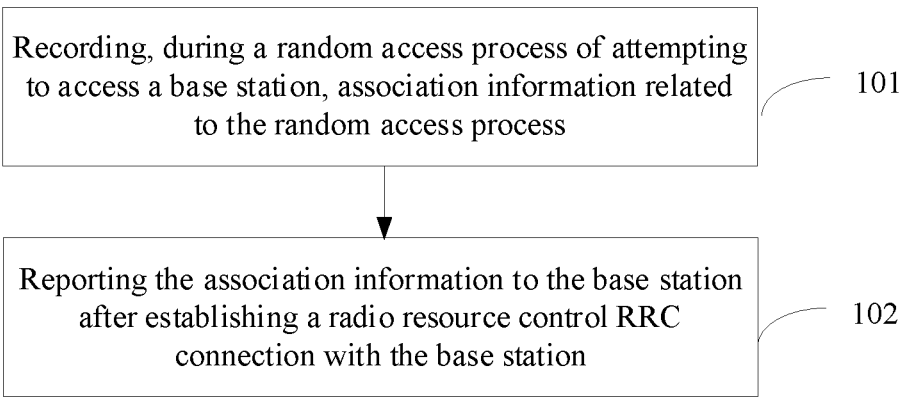
FIG. 2 is a schematic flowchart of a random access method shown according to an embodiment.

In the following, the random access method provided by the present disclosure will be introduced from the terminal side first. An embodiment of the present disclosure provides a random access method, which is performed by a terminal. Referring to FIG. 2, which is a flowchart of a random access method shown according to an embodiment, the method may include the following steps:

In a step 101, during a random access process of attempting to access a base station, association information related to the random access process may be recorded.

In an embodiment of the present disclosure, the association information is information, which is recorded by the terminal during a random access process of attempting to access the base station and related to the random access process, which may include, but is not limited to, at least one of the following: the number of times the terminal switches from a first random access type to a second random access type; the reason why the terminal switches from the first random access type to the second random access type; the transmission power value when the terminal successfully performs random access; the position information when the terminal successfully performs random access; the cell reference signal strength value measured when the terminal successfully performs random access.

Wherein the channel condition corresponding to the first random access type is better than the channel condition corresponding to the second random access type. In some embodiments, the first random access type may adopt the contention-based two-step random access type, and the second random access type may adopt the contention-based four-step random access type.

The reason why the terminal switches from the first random access type to the second random access type may include, but is not limited to, any of the following: when the terminal adopts the first random access type, the number of times the random access preamble is sent to the base station reaches a preset number of times; the base station instructs the terminal to switch from the first random access type to the second random access type as required.

The position information when the terminal successfully performs random access may include, but is not limited to, relative position information, such as a cell identity, and/or absolute position information, such as positioning information obtained through a GPS (Global Positioning System).

In a step 102, the association information may be reported to the base station after establishing a radio resource control RRC connection with the base station.

In an embodiment of the present disclosure, after establishing an RRC (Radio Resource Control) connection with the base station, that is, after the terminal is in a connected state, the terminal may report the already recorded association information to the base station through RRC signaling.

In the above described embodiment, a terminal may record, during a random access process of attempting to access a base station, association information related to the random access process, and then report the association information to the base station after establishing a RRC connection with the base station. The base station may determine, according to the association information reported by the terminal that has established the RRC connection with the base station, parameters of other terminals during the random access process of attempting to access the base station, which improves the success rate of the random access performed by the terminal.

Figure 3:
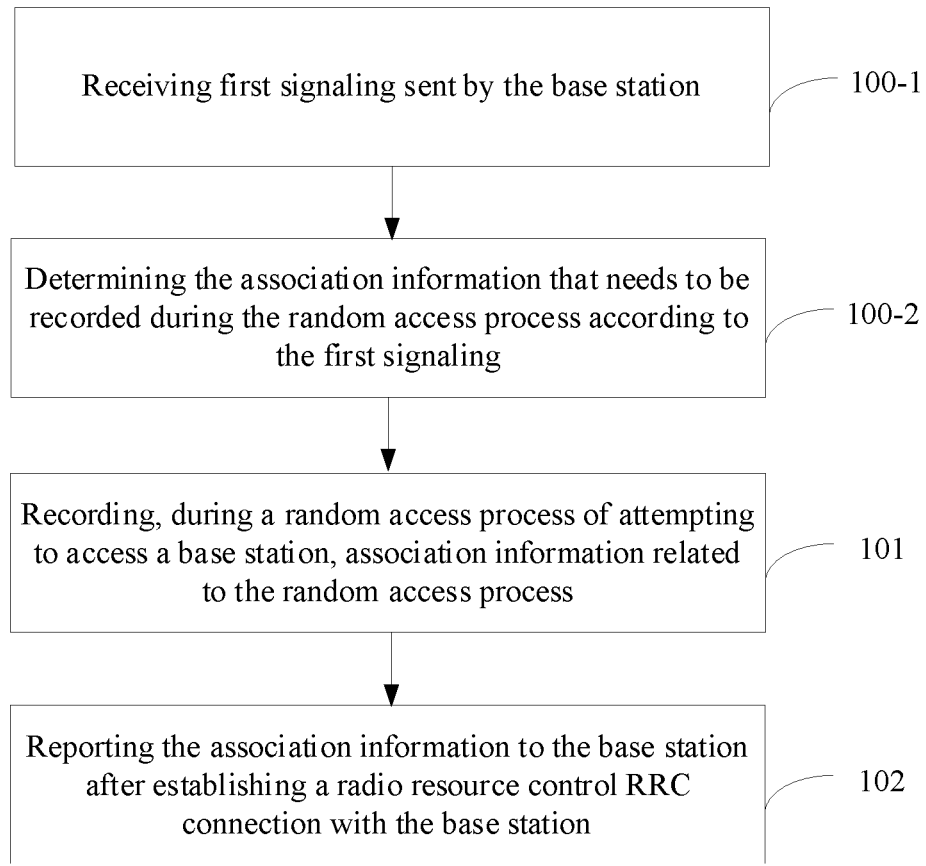
FIG. 3 is a schematic flowchart of another random access method shown according to an embodiment.

In an optional embodiment, referring to FIG. 3, which is a flow chart of another random access method shown according to the embodiment shown in FIG. 2, the method may further include:

In a step 100-1, first signaling sent by the base station may be received.

In an embodiment of the present disclosure, the first signaling may adopt, but is not limited to, RRC signaling. For example, when the terminal is in the connected state before, it may receive the first signaling sent by the base station, and the first signaling is used to instruct the terminal to determine the association information that needs to be recorded during the subsequent random access process of attempting to access the base station.

In a step 100-2, the association information that needs to be recorded during the random access process may be determined according to the first signaling.

In an embodiment of the present disclosure, according to the first signaling, the terminal may determine which item or items of association information needs or need to be recorded in the subsequent random access process.

For example, if the first signaling instructs the terminal to record the number of times the terminal switches from the first random access type to the second random access type, then the terminal switches to an idle state, and in the case where it is desired to establish an RRC connection with the base station again, the number of times the terminal switches from the first random access type to the second random access type will be recorded during the random access process of attempting to access the base station.

In the above described embodiment, the terminal may determine the association information that needs to be recorded during the random access process according to the first signaling sent by the base station, which is easy to implement and has high usability.

In an optional embodiment, for the above step 102, the terminal may report the association information to the base station in any one of the following manners.

In a first manner, after the RRC connection is established with the base station, the association information is immediately reported to the base station.

In an embodiment of the present disclosure, after establishing the RRC connection with the base station, if it is determined that the association information related to the random access process has been reported by itself, then the terminal may report the association information to the base station immediately.

In a second manner, after the RRC connection is established with the base station, the association information is reported to the base station according to the request of the base station.

Figure 4:
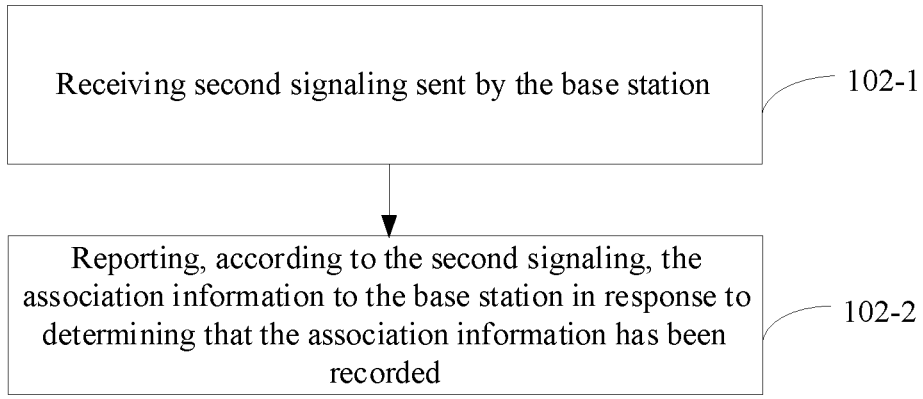
FIG. 4 is a schematic flowchart of another random access method shown according to an embodiment.

Referring to FIG. 4, which is a flowchart of another random access method shown according to the embodiment shown in FIG. 2, the step 102 may include:

In a step 102-1, second signaling sent by the base station may be received.

Wherein the second signaling is configured to request the terminal to report the association information. In some embodiments, the second signaling may adopt, but is not limited to, RRC signaling.

In a step 102-2, according to the second signaling, the association information may be reported to the base station in response to determining that the association information has been recorded.

In an embodiment of the present disclosure, the terminal may, according to the second signaling, that is, according to the request of the base station, report the association information to the base station in the case where it is determined that the association information has been recorded.

In the above described embodiment, the terminal can be caused to, after establishing an RRC connection with the base station, directly report the association information to the base station, or report the association information to the base station according to the request of the base station, so that the base station subsequently determines the parameters of other terminals during the random access process of attempting to access the base station, which improves the success rate of the random access performed by the terminal.

Figure 5:
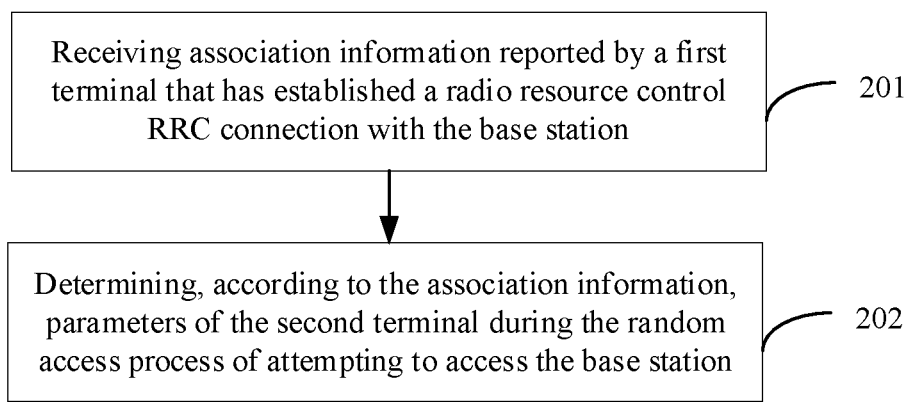
FIG. 5 is a schematic flowchart of another random access method shown according to an embodiment.

In the following, from the base station side, the random access method provided by the present disclosure will be introduced. The embodiment of the present disclosure provides another random access method, which is performed by a base station. Referring to FIG. 5, which is a flow chart of another random access method shown according to an embodiment, the method may include the following steps:

In a step 201, association information reported by a first terminal that has established a radio resource control RRC connection with the base station may be received.

In an embodiment of the present disclosure, the first terminal may report the association information to the base station through RRC signaling. The association information is information related to the random access process recorded by the first terminal during the random access process of attempting to access the base station, and may include, but is not limited to at least one of the following: the number of times the first terminal switches from a first random access type to a second random access type; the reason why the first terminal switches from the first random access type to the second random access type; the transmission power value when the first terminal successfully performs random access; the position information when the first terminal successfully performs random access; the cell reference signal strength value measured when the first terminal successfully performs random access.

In a step 202, according to the association information, parameters of the second terminal during the random access process of attempting to access the base station may be determined.

In an embodiment of the present disclosure, the parameters of the second terminal during the random access process of attempting to access the base station may include, but is not limited to at least one of the following: the initial transmission power value of the second terminal during the random access process; a threshold value of the Reference Signal Receiving Power of the second terminal during the random access process of attempting to access the base station Wherein the threshold value is configured to indicate that the second terminal selects the first random access type or the second random access type during the random access process. The second terminal may adopt the first random access type when the measured RSRP is greater than the threshold value, otherwise adopt the second random access type. Wherein the first random access type may adopt the contention-based two-step random access type, and the second random access type may adopt the contention-based four-step random access type.

In an embodiment of the present disclosure, the second terminal may determine its own initial transmission power value according to the association information reported by the first terminal that has established an RRC connection with the base station, which improves the success rate of the random access performed by the second terminal. In addition, the second terminal may also select a more reasonable random access type to access the base station according to the association information reported by the first terminal, which also improves the success rate of the random access performed by the second terminal.

In the above described embodiment, the base station may determine, according to the association information reported by the terminal that has established the RRC connection with the base station, parameters of other terminals during the random access process of attempting to access the base station, which improves the success rate of the random access performed by other terminals.

Figure 6:
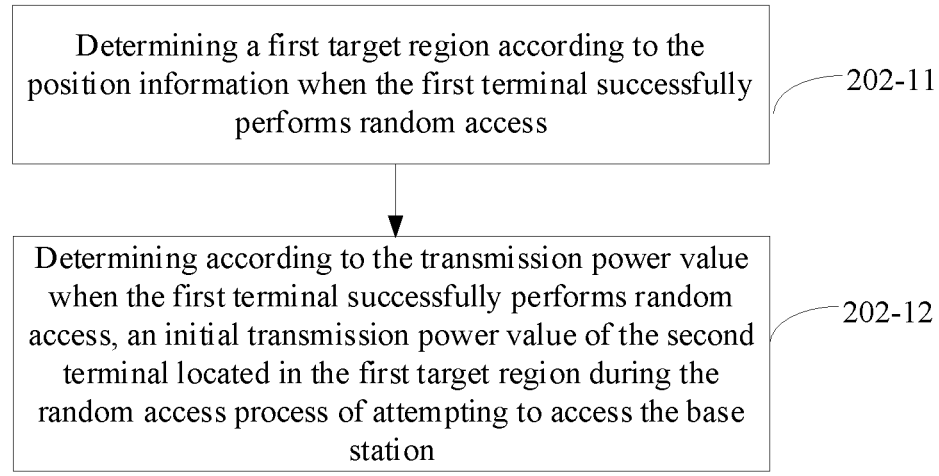
FIG. 6 is a schematic flowchart of another random access method shown according to an embodiment.

In an optional embodiment, referring to FIG. 6, which is a flowchart of another random access method shown according to the embodiment shown in FIG. 5, the step 202 may include:

In a step 202-11, a first target region may be determined according to the position information when the first terminal successfully performs random access.

In an embodiment of the present disclosure, the absolute position when the first terminal successfully performs random access may be used as the center of the circle, and a region within a preset radius may be used as the first target region. Alternatively, the relative position when the first terminal successfully performs random access, for example, the cell where the first terminal is located when it successfully performs random access may also be used as the first target region.

In a step 202-12, according to the transmission power value when the first terminal successfully performs random access, an initial transmission power value of the second terminal located in the first target region during the random access process of attempting to access the base station may be determined.

In an embodiment of the present disclosure, the second terminal may be a terminal, which is located in the first target region and is attempting to access the base station, and the second terminal may use a transmission power value, which is greater than or equal to the transmission power value when the first terminal successfully performs random access as the initial Transmission power value, so as to perform random access.

Figure 7:
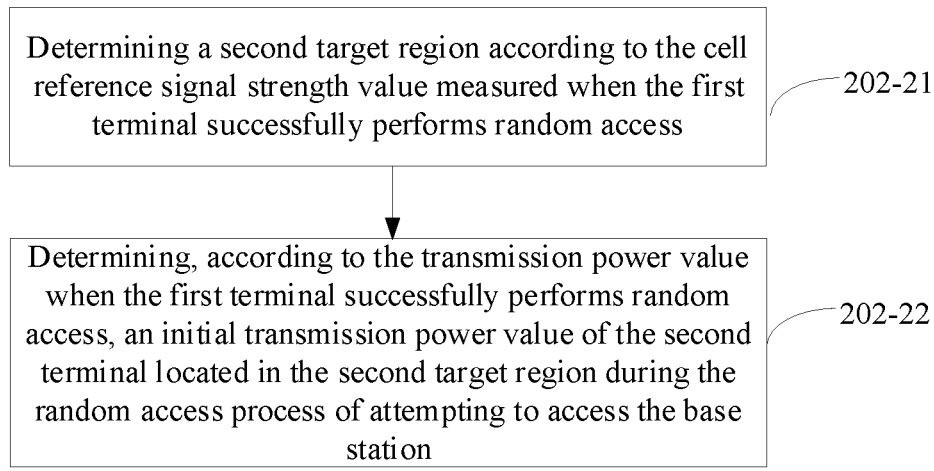
FIG. 7 is a schematic flowchart of another random access method shown according to an embodiment.

In an optional embodiment, referring to FIG. 7, which is a flowchart of another random access method shown according to the embodiment shown in FIG. 5, the step 202 may include:

In a step 202-21, a second target region may be determined according to the cell reference signal strength value measured when the first terminal successfully performs random access.

In an embodiment of the present disclosure, a region, in which the cell reference signal strength value is equal to the cell reference signal strength value measured when the first terminal successfully performs random access, and/or the difference between the cell reference signal strength values is within a preset range, may be used as the second target region.

In a step 202-22, according to the transmission power value when the first terminal successfully performs random access, an initial transmission power value of the second terminal located in the second target region during the random access process of attempting to access the base station may be determined.

In an embodiment of the present disclosure, the second terminal may be a terminal, which is located in the second target region and is attempting to access the base station, and the second terminal may use a transmission power value, which is greater than or equal to the transmission power value when the first terminal successfully performs random access as the initial Transmission power value, so as to perform random access.

In an optional embodiment, the step 202 may include:

In a step 202-31, according to the number of times the first terminal switches from a first random access type to a second random access type and/or the reason why the first terminal switches from the first random access type to the second random access type, a threshold value of the Reference Signal Receiving Power of the second terminal during the random access process of attempting to access the base station may be determined.

In an embodiment of the present disclosure, if the number of times the first terminal switches from the first random access type to the second random access type is relatively large, for example, reaches or exceeds a preset number of times, the threshold value of the Reference Signal Receiving Power of the second terminal during the random access process of attempting to access the base station may be increased, so that the second terminal reduces the possibility of performing random access by using the first random access type.

Conversely, if the number of times the first terminal switches from the first random access type to the second random access type is relatively small, for example, smaller than a preset number of times, the threshold value of the Reference Signal Receiving Power of the second terminal during the random access process of attempting to access the base station may be decreased, so that the second terminal increases the possibility of performing random access by using the first random access type.

In addition, if the reason why the first terminal switches from the first random access type to the second random access type is that the number of times the first terminal sends the random access preamble reaches or exceeds a preset number of times, the threshold value of the Reference Signal Receiving Power of the second terminal during the random access process of attempting to access the base station may be increased as well, so that the second terminal reduces the possibility of performing random access by using the first random access type. Conversely, the threshold value of the Reference Signal Receiving Power of the second terminal during the random access process of attempting to access the base station may be decreased, so that the second terminal increases the possibility of performing random access by using the first random access type.

In the above described embodiment, the base station can adjust the parameters of other terminals during the random access process of attempting to access the base station according to the association information reported by the terminal that has established an RRC connection with the base station, which improves the success rate of the random access performed by other terminals.

Figure 8:
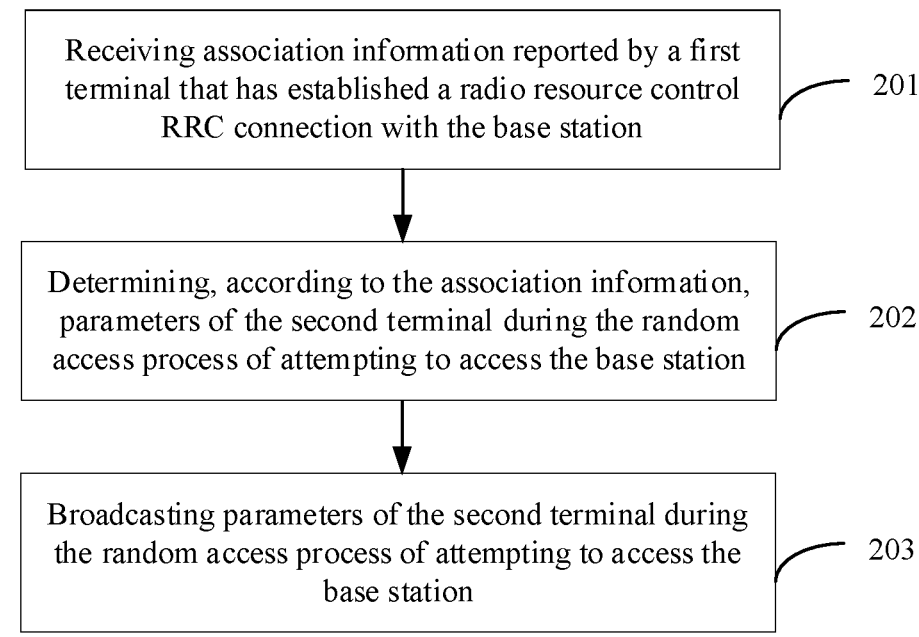
FIG. 8 is a schematic flowchart of another random access method shown according to an embodiment.

In an optional embodiment, referring to FIG. 8, which is a flow chart of another random access method shown according to the embodiment shown in FIG. 5, the above method may further include:

In a step 203, parameters of the second terminal during the random access process of attempting to access the base station may be broadcasted.

In the embodiment of the present disclosure, after the base station determines the parameters of the second terminal during the random access process of attempting to access the base station, because the second terminal has not yet accessed the base station, and the base station cannot send the above parameters to the second terminal through RRC signaling, then the base station can broadcast the above parameters, including but not limited to broadcasting through system messages, so that after receiving the above parameters, the second terminal in the idle state performs random access according to the parameters, thereby improving the success rate of the random access performed by other terminals.

In the above described embodiment, the base station may broadcast the parameters of the second terminal during the random access process of attempting to access the base station, so as to cause other terminals attempting to access the base station to perform random access according to the parameters, which improves the success rate of the random access performed by other terminals.

Figure 9:
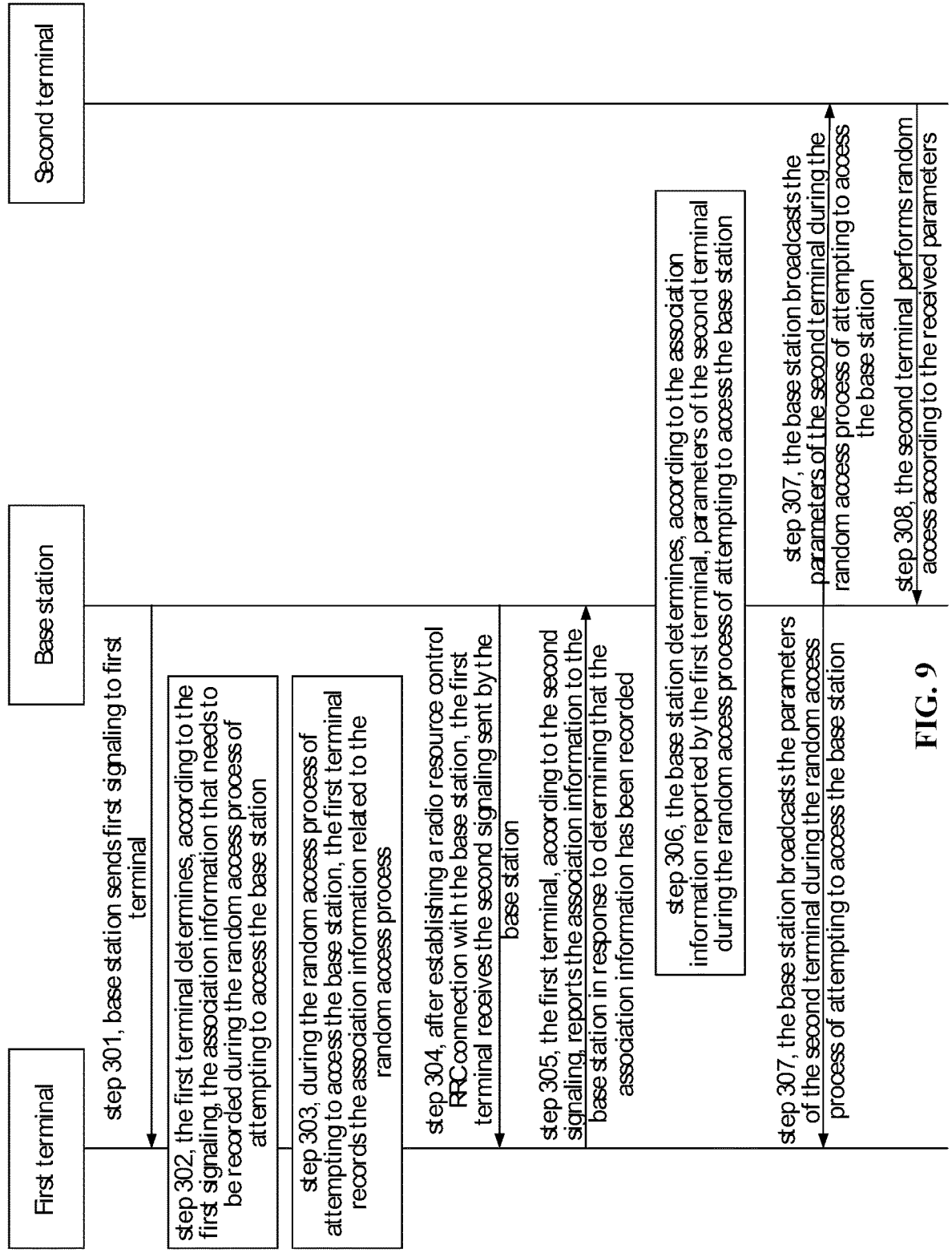
FIG. 9 is a schematic flowchart of another random access method shown according to an embodiment.

In an optional embodiment, referring to FIG. 9, which is a flowchart of another random access method shown according to an embodiment, the method may include the following steps:

In a step 301, a base station sends first signaling to a first terminal.

In an embodiment of the present disclosure, the first terminal is in a connected state, and the first signaling is RRC signaling.

In a step 302, the first terminal determines, according to the first signaling, the association information that needs to be recorded during the random access process of attempting to access the base station.

Wherein the association information comprises at least one of the following: the number of times the first terminal switches from a first random access type to a second random access type; the reason why the first terminal switches from the first random access type to the second random access type; the transmission power value when the first terminal successfully performs random access; the position information when the first terminal successfully performs random access; the cell reference signal strength value measured when the first terminal successfully performs random access.

In a step 303, during the random access process of attempting to access the base station, the first terminal records the association information related to the random access process.

In a step 304, after establishing a radio resource control RRC connection with the base station, the first terminal receives the second signaling sent by the base station.

Wherein the second signaling is used to request the terminal to report the association information, the second signaling adopting RRC signaling.

In a step 305, the first terminal, according to the second signaling, reports the association information to the base station in response to determining that the association information has been recorded.

Wherein the first terminal may report the association information to the base station by using RRC signaling.

In a step 306, the base station determines, according to the association information reported by the first terminal, parameters of the second terminal during the random access process of attempting to access the base station.

In a step 307, the base station broadcasts the parameters of the second terminal during the random access process of attempting to access the base station.

In a step 308, the second terminal performs random access according to the received parameters.

In the above described embodiment, the base station may determine, according to the association information reported by the terminal that has established the RRC connection with the base station, parameters of other terminals during the random access process of attempting to access the base station, which improves the success rate of the random access performed by other terminals.

Corresponding to the above described embodiments of the method for realizing the application functions, the present disclosure further provides embodiments of the apparatus for realizing the application functions.

Figure 10:
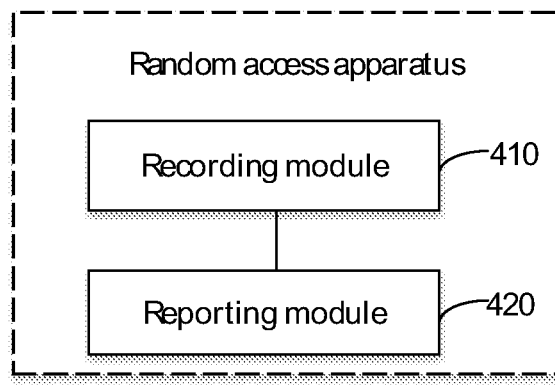
FIG. 10 is a block diagram of a random access apparatus shown according to an embodiment.

Referring to FIG. 10, which is a block diagram of a random access apparatus shown according to an embodiment, the apparatus is applied to a terminal and includes:

a recording module 410 configured to record, during a random access process of attempting to access a base station, association information related to the random access process;

a reporting module 420 configured to report the association information to the base station after establishing a radio resource control RRC connection with the base station.

Figure 11:
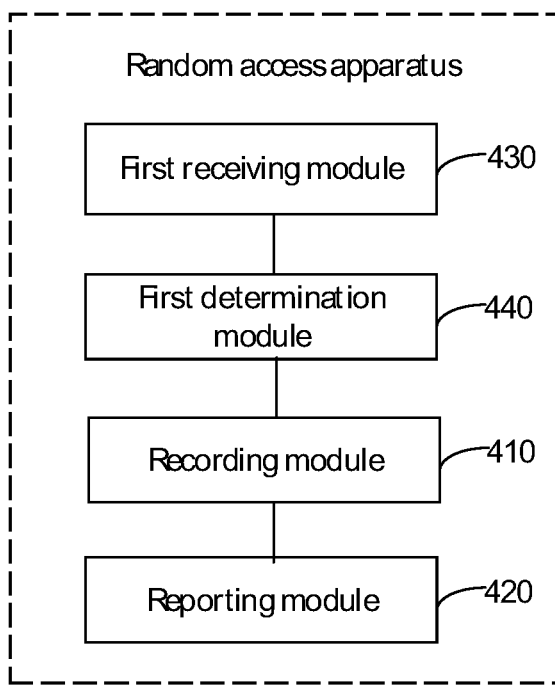
FIG. 11 is a block diagram of another random access apparatus shown according to an embodiment.

As shown in FIG. 11, FIG. 11 is a block diagram of another random access apparatus shown according to an embodiment of the present disclosure. The embodiment is based on the foregoing embodiment in FIG. 10, and the apparatus further includes:

a first receiving module 430 configured to receive first signaling sent by the base station;

a first determination module 440 configured to determine the association information that needs to be recorded during the random access process according to the first signaling.

Figure 12:
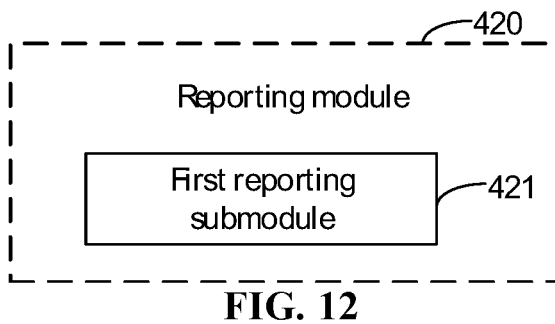
FIG. 12 is a block diagram of another random access apparatus shown according to an embodiment.

As shown in FIG. 12, FIG. 12 is a block diagram of another random access apparatus shown according to an embodiment of the present disclosure. The embodiment is based on the foregoing embodiment in FIG. 10, and the reporting module 420 includes:

a first reporting submodule 421 configured to report the association information to the base station in response to determining that the association information has been recorded.

Figure 13:
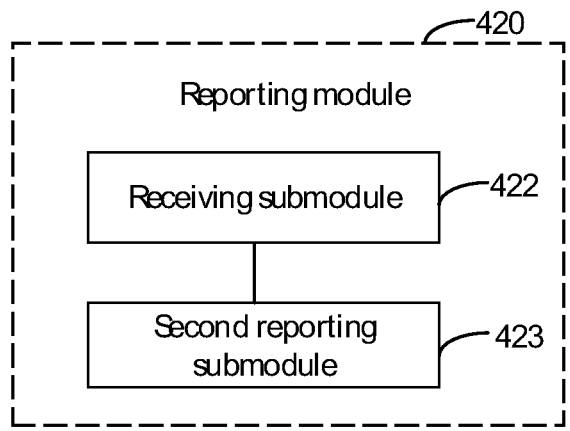
FIG. 13 is a block diagram of another random access apparatus shown according to an embodiment.

As shown in FIG. 13, FIG. 13 is a block diagram of another random access apparatus shown according to an embodiment of the present disclosure. The embodiment is based on the foregoing embodiment in FIG. 10, and the reporting module 420 includes:

a receiving submodule 422 configured to receive second signaling sent by the base station; wherein the second signaling is configured to request the terminal to report the association information;

a second reporting submodule 423 configured to report, according to the second signaling, the association information to the base station in response to determining that the association information has been recorded.

In some embodiments, the association information comprises at least one of the following:

the number of times the terminal switches from a first random access type to a second random access type;

the reason why the terminal switches from the first random access type to the second random access type;

the transmission power value when the terminal successfully performs random access;

the position information when the terminal successfully performs random access;

the cell reference signal strength value measured when the terminal successfully performs random access.

Figure 14:
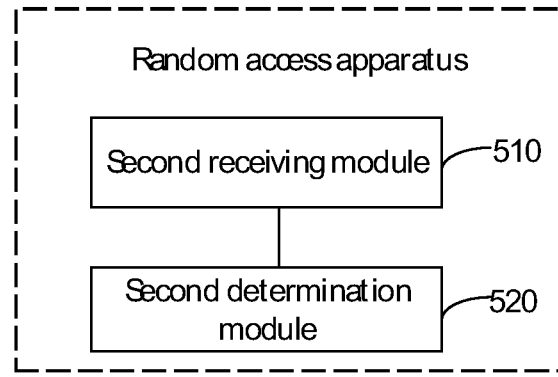
FIG. 14 is a block diagram of another random access apparatus shown according to an embodiment.

Referring to FIG. 14, which is a block diagram of another random access apparatus shown according to an embodiment, the apparatus is applied to a base station, and includes:

a second receiving module 510 configured to receive association information reported by a first terminal that has established a radio resource control RRC connection with the base station; wherein the association information is information related to the random access process recorded by the first terminal during the random access process of attempting to access the base station;

a second determination module 520 configured to determine, according to the association information, parameters of the second terminal during the random access process of attempting to access the base station.

In some embodiments, the association information comprises at least one of the following:

the number of times the first terminal switches from a first random access type to a second random access type;

the reason why the first terminal switches from the first random access type to the second random access type;

the transmission power value when the first terminal successfully performs random access;

the position information when the first terminal successfully performs random access;

the cell reference signal strength value measured when the first terminal successfully performs random access.

Figure 15:
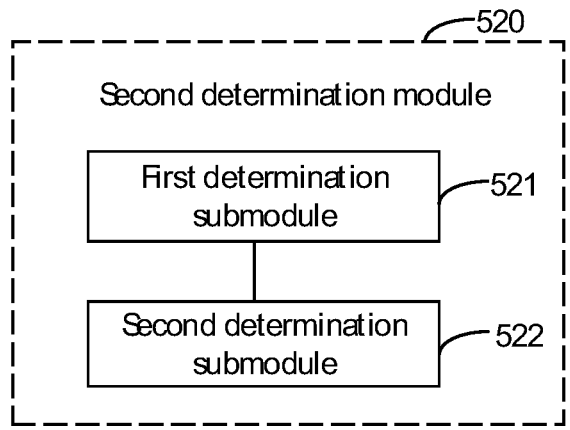
FIG. 15 is a block diagram of another random access apparatus shown according to an embodiment.

As shown in FIG. 15, FIG. 15 is a block diagram of another random access apparatus shown according to an embodiment of the present disclosure. The embodiment is based on the foregoing embodiment in FIG. 14, and the second determination module 520 includes:

a first determination submodule 521 configured to determine a first target region according to the position information when the first terminal successfully performs random access;

a second determination submodule 522 configured to determine, according to the transmission power value when the first terminal successfully performs random access, an initial transmission power value of the second terminal located in the first target region during the random access process of attempting to access the base station.

Figure 16:
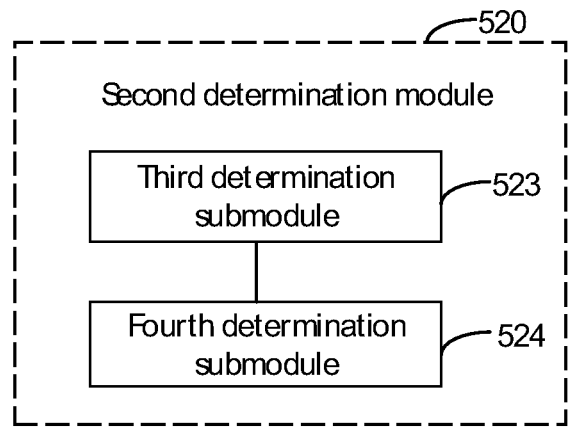
FIG. 16 is a block diagram of another random access apparatus shown according to an embodiment.

As shown in FIG. 16, FIG. 16 is a block diagram of another random access apparatus shown according to an embodiment of the present disclosure. The embodiment is based on the foregoing embodiment in FIG. 14, and the second determination module 520 includes:

a third determination submodule 523 configured to determine a second target region according to the cell reference signal strength value measured when the first terminal successfully performs random access;

a fourth determination submodule 524 configured to determine, according to the transmission power value when the first terminal successfully performs random access, an initial transmission power value of the second terminal located in the second target region during the random access process of attempting to access the base station.

Figure 17:
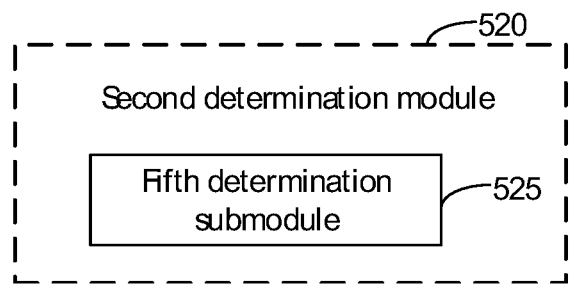
FIG. 17 is a block diagram of another random access apparatus shown according to an embodiment.

As shown in FIG. 17, FIG. 17 is a block diagram of another random access apparatus shown according to an embodiment of the present disclosure. The embodiment is based on the foregoing embodiment in FIG. 14, and the second determination module 520 includes:

a fifth determination submodule 525 configured to determine, according to the number of times the first terminal switches from a first random access type to a second random access type and/or the reason why the first terminal switches from the first random access type to the second random access type, a threshold value of the Reference Signal Receiving Power of the second terminal during the random access process of attempting to access the base station; wherein the threshold value is configured to indicate that the second terminal selects the first random access type or the second random access type during the random access process.

Figure 18:
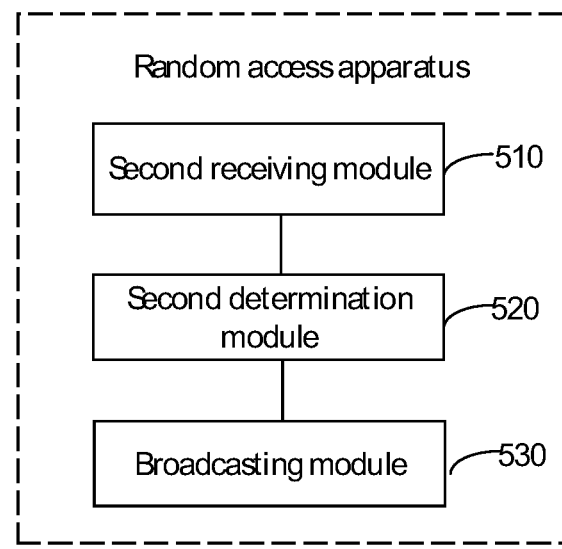
FIG. 18 is a block diagram of another random access apparatus shown according to an embodiment.

As shown in FIG. 18, FIG. 18 is a block diagram of another random access apparatus shown according to an embodiment of the present disclosure. The embodiment is based on the foregoing embodiment in FIG. 14, and the apparatus further includes:

a broadcasting module 530 configured to broadcast parameters of the second terminal during the random access process of attempting to access the base station.

Figure 19:
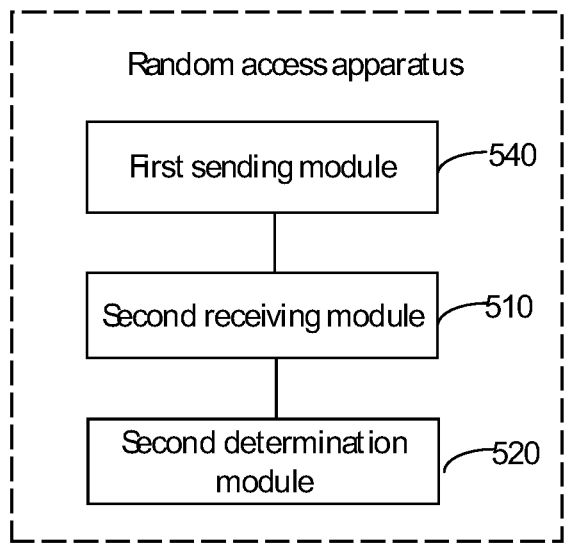
FIG. 19 is a block diagram of another random access apparatus shown according to an embodiment.

As shown in FIG. 19, FIG. 19 is a block diagram of another random access apparatus shown according to an embodiment of the present disclosure. The embodiment is based on the foregoing embodiment in FIG. 14, and the apparatus further includes:

a first sending module 540 configured to send first signaling to the first terminal; wherein the first signaling is configured to instruct the first terminal to determine, during the random access process, the association information that needs to be recorded.

Figure 20:
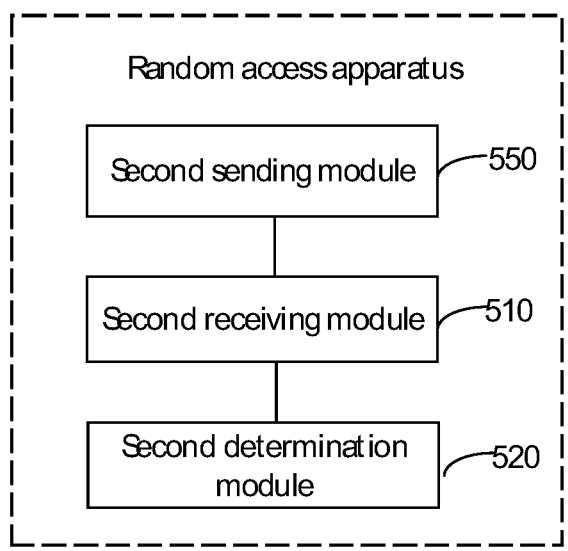
FIG. 20 is a block diagram of another random access apparatus shown according to an embodiment.

As shown in FIG. 20, FIG. 20 is a block diagram of another random access apparatus shown according to an embodiment of the present disclosure. The embodiment is based on the foregoing embodiment in FIG. 14, and the apparatus further includes:

a second sending module 550 configured to send second signaling to the first terminal in response to determining that the RRC connection has been established with the first terminal; wherein the second signaling is configured to request the first terminal to report the association information.

As for the apparatus embodiments, because they basically correspond to the method embodiments, for the related parts, please refer to the part of the description of the method embodiments. The apparatus embodiments described above are only illustrative, wherein the above-mentioned units described as separate components may or may not be physically separated, and the components shown as units may or may not be physical units, that is, they may be located in a place, or may also be distributed onto a plurality of network elements. Part or all of the modules can be selected according to actual needs to achieve the purpose of the solutions of the present disclosure. They can be understood and implemented by those skilled in the art without any creative effort.

Correspondingly, the present disclosure further provides a computer-readable storage medium, the storage medium stores a computer program, which is configured to execute any one of the random access methods for the terminal side.

Correspondingly, the present disclosure further provides a computer-readable storage medium, the storage medium stores a computer program, which is configured to execute any one of the random access methods for the base station side.

Correspondingly, the present disclosure further provides a random access apparatus, which is applied to a base station and includes:

a processor;
a memory for storing processor-executable instructions;
wherein the processor is configured to:
record, during a random access process of attempting to access a base station, association information related to the random access process;
report the association information to the base station after establishing a radio resource control RRC connection with the base station.

Figure 21:
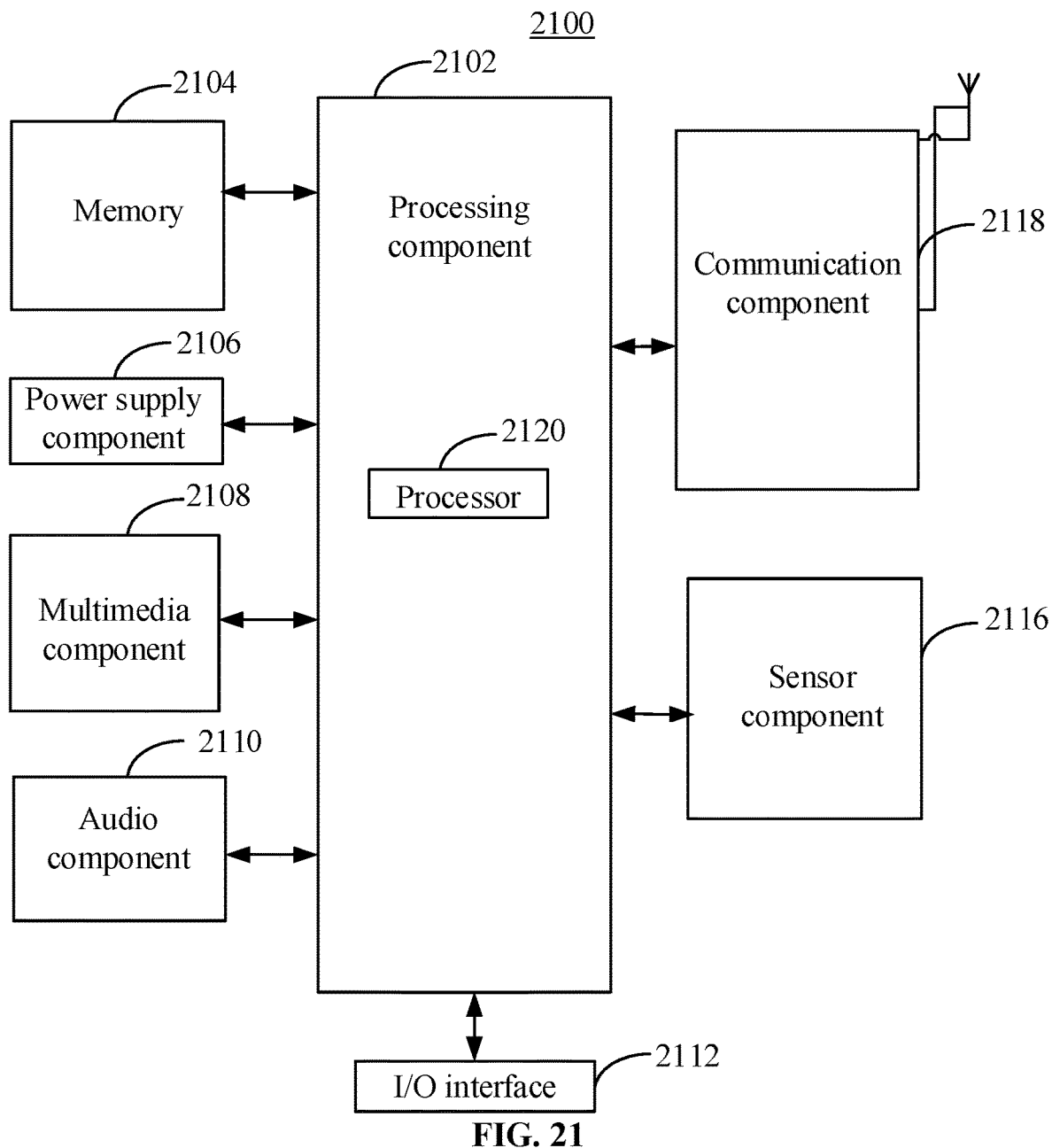
FIG. 21 is a schematic structural diagram of a random access apparatus shown according to an embodiment of the present disclosure.

FIG. 21 is a block diagram of an electronic device 2100 shown according to an embodiment. For example, the electronic device 2100 may be a terminal such as a mobile phone, a tablet computer, an e-book reader, a multimedia playback device, a wearable device, a vehicle terminal, an ipad, a smart TV, and the like.

Referring to FIG. 21, the electronic device 2100 may include one or more of the following components: a processing component 2102, a memory 2104, a power supply component 2106, a multimedia component 2108, an audio component 2110, an input/output (I/O) interface 2112, a sensor component 2116, and a communication component 2118.

The processing component 2102 generally controls the overall operations of the electronic device 2100, such as operations associated with displaying, phone calling, data communications, camera operations, and recording operations. The processing component 2102 may include one or more processors 2120 to execute instructions to complete all or part of the steps of the above described random access method. Additionally, the processing component 2102 may include one or more modules that facilitate interaction between the processing component 2102 and other components. For example, the processing component 2102 may include a multimedia module to facilitate interaction between the multimedia component 2108 and the processing component 2102. For another example, the processing component 2102 may read executable instructions from the memory, so as to implement the steps of a random access method provided by the foregoing respective embodiments.

The memory 2104 is configured to store various types of data to support operations at the electronic device 2100. Examples of such data include instructions for any application or method operating on the electronic device 2100, contact data, phonebook data, messages, pictures, videos, and the like. The memory 2104 may be implemented by any type of volatile or non-volatile storage devices or their combination, such as static random access memory (SRAM), electrically erasable programmable read-only memory (EEPROM), erasable Programmable Read Only Memory (EPROM), Programmable Read Only Memory (PROM), Read Only Memory (ROM), magnetic memory, flash memory, magnetic disk or optical disk.

The power supply component 2106 provides power to various components of the electronic device 2100. The power supply components 2106 may include a power supply management system, one or more power supplies, and other components associated with generation, management, and distribution power for the electronic device 2100.

The multimedia component 2108 includes a displaying screen providing an output interface between the electronic device 2100 and the user. In some embodiments, the multimedia component 2108 includes a front camera and/or a rear camera. When the electronic device 2100 is in an operation mode, such as a shooting mode or a video mode, the front camera and/or the rear camera can receive external multimedia data. Each of the front camera and the rear camera may be a fixed optical lens system or have focal length and optical zoom capability.

The audio component 2110 is configured to output and/or input audio signals. For example, the audio component 2110 includes a microphone (MIC), which is configured to receive external audio signals when the electronic device 2100 is in an operation mode, such as a calling mode, a recording mode and a voice recognition mode. Received audio signals may be further stored in the memory 2104 or sent via the communication component 2118. In some embodiments, the audio c 2110 also includes a speaker for outputting audio signals.

The I/O interface 2112 provides an interface between the processing component 2102 and a peripheral interface module, which may be a keyboard, a click wheel, a button, and the like. These buttons may include, but are not limited to: a home button, a volume button, a start button, and a lock button.

The sensor component 2116 includes one or more sensors for providing various aspects of status assessments for the electronic device 2100. For example, the sensor component 2116 can detect the on/off state of the electronic device 2100, the relative positioning of the components, for example, the components are the display and the keypad of the electronic device 2100, the sensor component 2116 can also detect changes in position of the electronic device 2100 or one of the components of the electronic devices 2100, presence or absence of contact of the user with the electronic device 2100, orientation or acceleration/deceleration of the electronic device 2100 and temperature changes of the electronic device 2100. The sensor component 2116 may include a proximity sensor configured to detect the presence of nearby objects in the absence of any physical contact. The sensor component 2116 may further include optical sensors, such as CMOS or CCD image sensors, for use in imaging applications. In some embodiments, the sensor component 2116 may further include an acceleration sensor, a gyroscope sensor, a magnetic sensor, a pressure sensor or a temperature sensor.

The communication component 2118 is configured to facilitate wired or wireless communication between the electronic device 2100 and other devices. The electronic device 2100 can access a wireless network based on communication standards, such as Wi-Fi, 2G, 3G, 4G or 5G, or a combination thereof. In an embodiment, the communication component 2118 receives broadcast signals or broadcast related information from an external broadcast management system via a broadcast channel. In an embodiment, the communication component 2118 further includes a near field communication (NFC) module to facilitate short-range communication. For example, the NFC module may be implemented based on Radio Frequency Identification (RFID) technology, Infrared Data Association (IrDA) technology, Ultra Wideband (UWB) technology, Bluetooth (BT) technology and other technologies.

In an embodiment, the electronic device 2100 may be implemented by one or more application specific integrated circuits (ASICs), digital signal processors (DSPs), digital signal processing devices (DSPDs), programmable logic devices (PLDs), field programmable gate array (FPGA), controllers, microcontrollers, microprocessors or other electronic elements, and configured to execute the above described method for determining Hybrid Automatic Repeat reQuest HARQ feedback time delay.

In an embodiment, a non-transitory machine-readable storage medium including instructions is further provided, such as the memory 2104 including instructions, and the above instructions can be executed by the processor 2120 of the electronic device 2100 to complete the above described wireless charging method. For example, the non-transitory computer readable storage medium may be a ROM, a random access memory (RAM), a CD-ROM, a magnetic tape, a floppy disk, an optical data storage device, and the like.

Correspondingly, the present disclosure further provides a random access apparatus, which is applied to a base station and includes:
    a processor;
    a memory for storing processor-executable instructions;
    wherein the processor is configured to:
    receive association information reported by a first terminal that has established a radio resource control RRC connection with the base station; wherein the association information is information related to the random access process recorded by the first terminal during the random access process of attempting to access the base station;
    determine, according to the association information, parameters of the second terminal during the random access process of attempting to access the base station.

Figure 22:
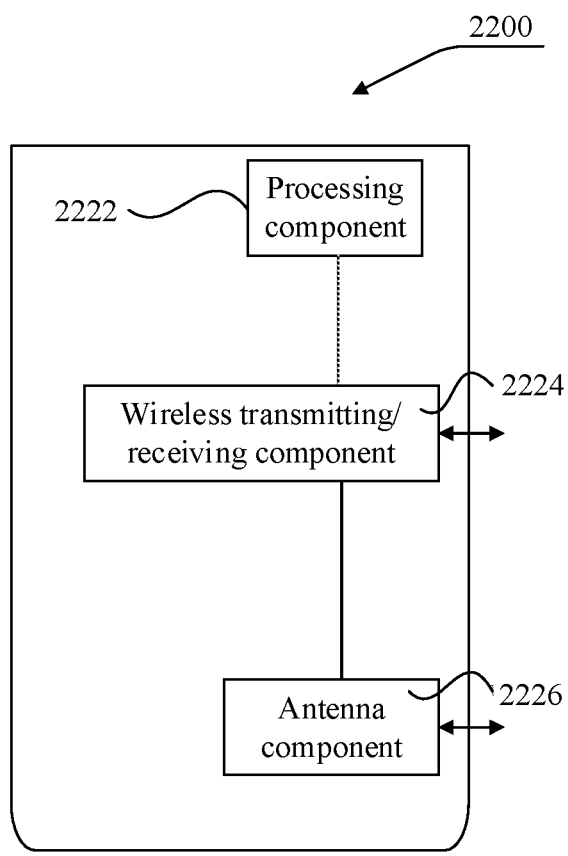
FIG. 22 is a schematic structural diagram of another random access apparatus shown according to an embodiment of the present disclosure.

As shown in FIG. 22, FIG. 22 is a schematic structural diagram of another random access apparatus 2200 shown according to an embodiment. The apparatus 2200 may be provided as a base station. Referring to FIG. 22, the apparatus 2200 includes a processing component 2222, a wireless transmitting/receiving component 2224, an antenna component 2226, and a signal processing part specific to the wireless interface, and the processing component 2222 may further include one or more processors.

One of the processors in the processing component 2222 may be configured to execute any one of the above random access methods on the base station side.

The Listen Before Talk (LBT) mechanism is required by regulations of many countries, so if the NR wants to work normally in the unlicensed frequency bands, it also needs to follow the LBT mechanism. However, following the LBT mechanism means that increasing of random access time delay may be caused.

The existing contention-based random access process includes a contention-based four-step random access type, and also includes shortening the contention-based four-step random access type to a contention-based two-step random access type. However, during the random access process of a terminal, it is a problem to be solved which random access type to choose to be able to ensure success rate of random access.

In order to overcome the problems existing in related technologies, embodiments of the present disclosure provide a random access method and apparatus, and a storage medium.

In some embodiments, a random access method performed by a terminal is provided, which includes:
    recording, during a random access process of attempting to access a base station, association information related to the random access process;
    reporting the association information to the base station after establishing a radio resource control RRC connection with the base station.

In some embodiments, the method further includes:
    receiving first signaling sent by the base station;
    determine the association information that needs to be recorded during the random access process according to the first signaling.

In some embodiments, the reporting the association information to the base station includes:
    reporting the association information to the base station in response to determining that the association information has been recorded.

In some embodiments, the reporting the association information to the base station includes:
    receiving second signaling sent by the base station; in which the second signaling is configured to request the terminal to report the association information;
    reporting, according to the second signaling, the association information to the base station in response to determining that the association information has been recorded.

In some embodiments, the association information includes at least one of the following:
    the number of times the terminal switches from a first random access type to a second random access type;
    the reason why the terminal switches from the first random access type to the second random access type;
    the transmission power value when the terminal successfully performs random access;
    the position information when the terminal successfully performs random access;
    the cell reference signal strength value measured when the terminal successfully performs random access.

In some embodiments, a random access method performed by a base station is provided, which includes:
    receiving association information reported by a first terminal that has established a radio resource control RRC connection with the base station; in which the association information is information related to the random access process recorded by the first terminal during the random access process of attempting to access the base station;

determining, according to the association information, parameters of the second terminal during the random access process of attempting to access the base station.

In some embodiments, the association information includes at least one of the following:
the number of times the first terminal switches from a first random access type to a second random access type;
the reason why the first terminal switches from the first random access type to the second random access type;
the transmission power value when the first terminal successfully performs random access;
the position information when the first terminal successfully performs random access;
the cell reference signal strength value measured when the first terminal successfully performs random access.

In some embodiments, the determining, according to the association information, parameters of the second terminal during the random access process of attempting to access the base station includes:
determining a first target region according to the position information when the first terminal successfully performs random access;
determining, according to the transmission power value when the first terminal successfully performs random access, an initial transmission power value of the second terminal located in the first target region during the random access process of attempting to access the base station.

In some embodiments, the determining, according to the association information, parameters of the second terminal during the random access process of attempting to access the base station includes:
determining a second target region according to the cell reference signal strength value measured when the first terminal successfully performs random access;
determining, according to the transmission power value when the first terminal successfully performs random access, an initial transmission power value of the second terminal located in the second target region during the random access process of attempting to access the base station.

In some embodiments, the determining, according to the association information, parameters of the second terminal during the random access process of attempting to access the base station includes:
determining, according to at least one of the number of times the first terminal switches from a first random access type to a second random access type or the reason why the first terminal switches from the first random access type to the second random access type, a threshold value of the Reference Signal Receiving Power of the second terminal during the random access process of attempting to access the base station; in which the threshold value is configured to indicate that the second terminal selects the first random access type or the second random access type during the random access process.

In some embodiments, the method further includes:
broadcasting parameters of the second terminal during the random access process of attempting to access the base station.

In some embodiments, the method further includes:
sending first signaling to the first terminal; in which the first signaling is configured to instruct the first terminal to determine, during the random access process, the association information that needs to be recorded.

In some embodiments, the method further includes:
sending second signaling to the first terminal in response to determining that the RRC connection has been established with the first terminal; in which the second signaling is configured to request the first terminal to report the association information.

In some embodiments, a random access apparatus applied to a terminal is provided, which includes:
a recording module configured to record, during a random access process of attempting to access a base station, association information related to the random access process;
a reporting module configured to report the association information to the base station after establishing a radio resource control RRC connection with the base station.

In some embodiments, the apparatus further includes:
a first receiving module configured to receive first signaling sent by the base station;
a first determination module configured to determine the association information that needs to be recorded during the random access process according to the first signaling.

In some embodiments, the reporting module includes:
a first reporting submodule configured to report the association information to the base station in response to determining that the association information has been recorded.

In some embodiments, the reporting module includes:
a receiving submodule configured to receive second signaling sent by the base station; in which the second signaling is configured to request the terminal to report the association information;
a second reporting submodule configured to report, according to the second signaling, the association information to the base station in response to determining that the association information has been recorded.

In some embodiments, the association information includes at least one of the following:
the number of times the terminal switches from a first random access type to a second random access type;
the reason why the terminal switches from the first random access type to the second random access type;
the transmission power value when the terminal successfully performs random access;
the position information when the terminal successfully performs random access;
the cell reference signal strength value measured when the terminal successfully performs random access.

In some embodiments, a random access apparatus applied to a base station is provided, which includes:
a second receiving module configured to receive association information reported by a first terminal that has established a radio resource control RRC connection with the base station; in which the association information is information related to the random access process recorded by the first terminal during the random access process of attempting to access the base station;
a second determination module configured to determine, according to the association information, parameters of the second terminal during the random access process of attempting to access the base station.

In some embodiments, the association information includes at least one of the following:
the number of times the first terminal switches from a first random access type to a second random access type;
the reason why the first terminal switches from the first random access type to the second random access type;
the transmission power value when the first terminal successfully performs random access;
the position information when the first terminal successfully performs random access;
the cell reference signal strength value measured when the first terminal successfully performs random access.

In some embodiments, the second determination module includes:
a first determination submodule configured to determine a first target region according to the position information when the first terminal successfully performs random access;
a second determination submodule configured to determine, according to the transmission power value when the first terminal successfully performs random access, an initial transmission power value of the second terminal located in the first target region during the random access process of attempting to access the base station.

In some embodiments, the second determination module includes:
a third determination submodule configured to determine a second target region according to the cell reference signal strength value measured when the first terminal successfully performs random access;
a fourth determination submodule configured to determine, according to the transmission power value when the first terminal successfully performs random access, an initial transmission power value of the second terminal located in the second target region during the random access process of attempting to access the base station.

In some embodiments, the second determination module includes:
a fifth determination submodule configured to determine, according to at least one of the number of times the first terminal switches from a first random access type to a second random access type or the reason why the first terminal switches from the first random access type to the second random access type, a threshold value of the Reference Signal Receiving Power of the second terminal during the random access process of attempting to access the base station; in which the threshold value is configured to indicate that the second terminal selects the first random access type or the second random access type during the random access process.

In some embodiments, the apparatus further includes:
a broadcasting module configured to broadcast parameters of the second terminal during the random access process of attempting to access the base station.

In some embodiments, the apparatus further includes:
a first sending module configured to send first signaling to the first terminal; in which the first signaling is configured to instruct the first terminal to determine, during the random access process, the association information that needs to be recorded.

In some embodiments, the apparatus further includes:
a second sending module configured to send second signaling to the first terminal in response to determining that the RRC connection has been established with the first terminal; in which the second signaling is configured to request the first terminal to report the association information.

In some embodiments, a computer-readable storage medium is provided, the storage medium stores a computer program, which is configured to execute any one of the random access methods according to the first aspect.

In some embodiments, a computer-readable storage medium is provided, the storage medium stores a computer program, which is configured to execute any one of the random access methods according to the second aspect.

In some embodiments, a random access apparatus is provided, which is applied to a terminal and includes:
a processor;
a memory for storing processor-executable instructions;
in which the processor is configured to:
record, during a random access process of attempting to access a base station, association information related to the random access process;
report the association information to the base station after establishing a radio resource control RRC connection with the base station.

In some embodiments, a random access apparatus is provided, which is applied to a base station and includes:
a processor;
a memory for storing processor-executable instructions;
in which the processor is configured to:
receive association information reported by a first terminal that has established a radio resource control RRC connection with the base station; in which the association information is information related to the random access process recorded by the first terminal during the random access process of attempting to access the base station;
determine, according to the association information, parameters of the second terminal during the random access process of attempting to access the base station.

The technical solutions provided by the embodiments of the present disclosure may include the following beneficial effects:

In an embodiment of the present disclosure, a terminal may record, during a random access process of attempting to access a base station, association information related to the random access process, and then report the association information to the base station after establishing a RRC connection with the base station. The base station may determine, according to the association information reported by the terminal that has established the RRC connection with the base station, parameters of other terminals during the random access process of attempting to access the base station, which improves the success rate of the random access performed by the terminal.

In an embodiment of the present disclosure, the terminal may determine the association information that needs to be recorded during the random access process according to the first signaling sent by the base station, which is easy to implement and has high usability.

In an embodiment of the present disclosure, the terminal may, after having established a RRC connection with the base station, immediately report the association information to the base station in response to determining that the association information has been recorded by itself. Alternatively, the terminal may, after having established a RRC connection with the base station, report the association information to the base station according to the second signaling sent by the base station and to determining that the association information has been recorded by itself. The second signaling is signaling for the base station to request the terminal to report the association information. Through the above process, the terminal can be caused to report the already recorded association information to the base station after establishing an RRC connection with the base station, so that the base station subsequently determines the parameters of other terminals during the random access process of attempting to access the base station, which improves the success rate of the random access performed by the terminal.

Other embodiments of the disclosure will readily occur to those skilled in the art after consideration of the specification and practice of the invention disclosed herein. The present disclosure is intended to cover any modification, use or adaptive change of the present disclosure, and these modifications, uses or adaptive changes follow the general principles of the present disclosure and include common knowledge or commonly used technical means in the technical field, which are not disclosed in the present disclosure. The specification and the embodiments are to be considered exemplary only, with the true scope and the spirit of the present disclosure being indicated by the following claims.

It should be understood that the present disclosure is not limited to the precise constructions which have been described above and shown in the accompanying drawings, and various modifications and changes may be made without departing from the scope thereof. The scope of the present disclosure is limited only by the appended claims.

The invention claimed is:

1. A random access method, comprising:
  recording, by a terminal, association information related to a random access process of attempting to access a base station during the random access process; and
  reporting, by the terminal, the association information to the base station after establishing a radio resource control (RRC) connection with the base station, wherein the association information is configured to determine parameters in a random access process that a second terminal attempts to access the base station, wherein the parameters comprise a Reference Signal Receiving Power (RSRP) threshold of the second terminal during the random access process of attempting to access the base station, a first access random type is selected in response to determining that a measured RSRP is greater than the RSRP threshold, and a second access random type is selected in response to determining that the measured RSRP is less than or equal to the RSRP threshold.

2. The method according to claim 1, further comprising:
  receiving a first signaling sent by the base station; and
  determining, according to the first signaling, the association information that needs to be recorded during the random access process.

3. The method according to claim 1, wherein reporting the association information to the base station comprises:
  reporting the association information to the base station in response to determining that the association information has been recorded.

4. The method according to claim 1, wherein reporting the association information to the base station comprises:
  receiving a second signaling sent by the base station; wherein the second signaling is configured to request the terminal to report the association information; and
  reporting, according to the second signaling, the association information to the base station in response to determining that the association information has been recorded.

5. The method according to claim 1, wherein the association information comprises at least one of:
  a number of times that the terminal switches from a first random access type to a second random access type;
  a reason why the terminal switches from a first random access type to a second random access type;
  a transmission power value when the terminal successfully performs random access;
  position information when the terminal successfully performs random access; or
  a cell reference signal strength value that is measured when the terminal successfully performs random access.

6. A random access method, comprising:
  receiving, by a base station, association information reported by a first terminal that has established a radio resource control (RRC) connection with the base station; wherein the association information is information related to a random access process that the first terminal attempts to access the base station and recorded during the random access process; and
  determining, by the base station, according to the association information, parameters in a random access process that a second terminal attempts to access the base station, wherein the association information is configured to determine parameters in a random access process that a second terminal attempts to access the base station, wherein the parameters comprise a Reference Signal Receiving Power (RSRP) threshold of the second terminal during the random access process of attempting to access the base station, a first access random type is selected in response to determining that a measured RSRP is greater than the RSRP threshold, and a second access random type is selected in response to determining that the measured RSRP is less than or equal to the RSRP threshold.

7. The method according to claim 6, wherein the association information comprises at least one of:
  a number of times that the first terminal switches from a first random access type to a second random access type;
  a reason why the first terminal switches from a first random access type to a second random access type;
  a transmission power value when the first terminal successfully performs random access;
  position information when the first terminal successfully performs random access; or
  a cell reference signal strength value that is measured when the first terminal successfully performs random access.

8. The method according to claim 7, wherein determining, according to the association information, parameters in the random access process that the second terminal attempts to access the base station comprises:
  determining a first target region according to the position information when the first terminal successfully performs the random access; and
  determining, according to the transmission power value when the first terminal successfully performs the random access, an initial transmission power value in the random access process that the second terminal located in the first target region attempts to access the base station.

9. The method according to claim 7, wherein determining, according to the association information, parameters in the random access process that the second terminal attempts to access the base station comprises:

determining a second target region according to the cell reference signal strength value measured when the first terminal successfully performs the random access; and determining, according to the transmission power value when the first terminal successfully performs the random access, an initial transmission power value in the random access process that the second terminal located in the second target region attempts to access the base station.

10. The method according to claim 7, wherein determining, according to the association information, parameters in the random access process that the second terminal attempts to access the base station comprises:

determining, according to at least one of the number of times that the first terminal switches from the first random access type to the second random access type or the reason why the first terminal switches from the first random access type to the second random access type, a threshold value for a reference signal receiving power in the random access process that the second terminal attempts to access the base station; wherein the threshold value is configured to indicate that the second terminal selects the first random access type or the second random access type during the random access process.

11. The method according to claim 6, further comprising:
broadcasting the parameters in the random access process that the second terminal attempts to access the base station.

12. The method according to claim 6, further comprising:
sending a first signaling to the first terminal; wherein the first signaling is configured to instruct the first terminal to determine, during the random access process, the association information that needs to be recorded.

13. The method according to claim 6, further comprising:
sending a second signaling to the first terminal in response to determining that the RRC connection has been established with the first terminal; wherein the second signaling is configured to request the first terminal to report the association information.

14. A non-transitory computer-readable storage medium, having a computer program stored thereon, wherein the computer program is configured to execute the random access method according to claim 1.

15. A non-transitory computer-readable storage medium, having a computer program stored thereon, wherein the computer program is configured to execute the random access method according to claim 6.

16. A terminal, comprising:
a processor; and
a memory for storing instructions executable by the processor;
wherein the processor is configured to:
record association information related to a random access process of attempting to access a base station during the random access process; and
report the association information to the base station after establishing a radio resource control (RRC) connection with the base station,
wherein the association information is configured to determine parameters in a random access process that a second terminal attempts to access the base station, wherein the parameters comprise a Reference Signal Receiving Power (RSRP) threshold of the second terminal during the random access process of attempting to access the base station, a first access random type is selected in response to determining that a measured RSRP is greater than the RSRP threshold, and a second access random type is selected in response to determining that the measured RSRP is less than or equal to the RSRP threshold.

17. A base station, comprising:
a processor;
a memory for storing instructions executable by the processor;
wherein the processor is configured to perform a random access method according to claim 6.

18. The terminal according to claim 16, wherein the processor is configured to:
receive a first signaling sent by the base station; and
determine, according to the first signaling, the association information that needs to be recorded during the random access process.

19. The terminal according to claim 16, wherein the processor is configured to:
report the association information to the base station in response to determining that the association information has been recorded.

20. The terminal according to claim 16, wherein the processor is configured to:
receive a second signaling sent by the base station; wherein the second signaling is configured to request the terminal to report the association information; and
report, according to the second signaling, the association information to the base station in response to determining that the association information has been recorded.

* * * * *